United States Patent [19]

Lincoln et al.

[11] Patent Number: 5,949,781
[45] Date of Patent: Sep. 7, 1999

[54] CONTROLLER FOR ATM SEGMENTATION AND REASSEMBLY

[75] Inventors: Bradford C. Lincoln; Douglas M. Brady, both of Boulder; David R. Meyer, Lakewood; Warner B. Andrews, Jr., Boulder, all of Colo.

[73] Assignee: Brooktree Corporation, San Diego, Calif.

[21] Appl. No.: 08/467,311

[22] Filed: Jun. 6, 1995

Related U.S. Application Data

[62] Division of application No. 08/299,068, Aug. 31, 1994, abandoned.

[51] Int. Cl.$^6$ .................................................. H04L 12/56
[52] U.S. Cl. ........................................ 370/395; 370/468
[58] Field of Search .......................... 370/60, 60.1, 94.1, 370/94.2, 84, 85.6, 85.7, 395, 468, 399, 412, 413, 414, 417, 418, 419, 474, 420, 230, 235, 397, 429, 433

[56] References Cited

U.S. PATENT DOCUMENTS

| | | | |
|---|---|---|---|
| 5,255,265 | 10/1993 | Eng et al. .................................. | 370/60 |
| 5,272,697 | 12/1993 | Fraser et al. ............................. | 370/235 |
| 5,448,559 | 9/1995 | Hayter et al. ........................... | 370/94.2 |
| 5,506,841 | 4/1996 | Sandquist ................................. | 370/60.1 |
| 5,521,916 | 5/1996 | Choudhury et al. .................... | 370/94.2 |
| 5,533,020 | 7/1996 | Byrn et al. ............................... | 370/94.2 |
| 5,649,110 | 7/1997 | Ben-Nun et al. ........................ | 395/849 |

Primary Examiner—Chau Nguyen
Attorney, Agent, or Firm—Merchant & Gould

[57] ABSTRACT

A header and a payload in a cell are separated for transfer between a cell interface and a host memory. The header is transferred to a control memory. For transfer to the host memory, the control memory initially provides a host-memory region address and the region length. The payload is recorded in such region. The control memory also provides a second host-memory region address, and length, when the payload length exceeds the payload length in the first address region. For transfer from the host memory to the cell interface, the control memory provides a host memory region address and the header combines the header and the payload and passes the combination to the cell interface. Cells from different sources (i.e. terminals) are scheduled at table positions dependent upon their individual transfer rates. The cells at the scheduled positions are normally transferred in time slots corresponding to such positions. When more than one (1) cell is scheduled at the same position, one (1) cell is transferred on a preset priority basis to the corresponding time slot. The other cells are delayed for transfer subsequently in idle time slots (i.e. no cell normally scheduled) in the same or other priorities. The cell delays for each source are accumulated to a maximum preset value. When the cell delays accumulated for a source exceed the normal time spacing between cells from that source, a cell the source transfers a cell in an idle time slot prior to the normally scheduled time slot to compensate for such delay.

31 Claims, 5 Drawing Sheets

CONTROLLER FOR ATM SEGMENTATION AND REASSEMBLY

This is a division of application Ser. No. 08/299,068 filed Aug. 31, 1994, now abandoned.

This invention relates to telecommunications systems for, and methods of, transferring information through telephone lines. More particularly, this invention relates to systems for, and methods of, transferring information such as digitally encoded television and voice signals efficiently and reliably through telephone lines.

BACKGROUND OF THE INVENTION

Telephone systems in the United States provide central offices for receiving signals from calling telephones within a particular radius such as one (1) to two (2) miles from the central office and for transmitting telephone signals to such telephones. The telephone signals from a calling telephone are then transmitted through long distances from such central office. The telephone signals then pass to the receiving telephone through a central office within a radius of one (1) mile to two (2) miles from such central office.

The telephone signals are transmitted long distance between central offices through optical fibers which have replaced other media previously provided for such purposes. The optical fibers have certain distinctive advantages over the lines previously provided. They allow a significantly increased number of signals from different telephones to be transmitted at the same time through the optical fibers. They pass the digitally-encoded signals with a higher accuracy than other media.

Various systems have been adopted to carry digitally-encoded signals for telephone, video, and data services. One of such systems now being adopted is designated as asynchronous transfer mode (ATM). This system is advantageous because it recognizes that generally signals travel in only one direction at any one time between a calling subscriber and a receiving subscriber. The system preserves bandwidth in the other direction so that a maximum number of different messages can be transmitted in such direction.

In ATM systems, cells are provided to transmit information between access multiplexers or terminals through central offices. Each of the cells contains headers identifying the calling and receiving stations and also contains a payload providing the information being transmitted and received. The cells pass from the calling telephone through the access multiplexers to a first central station. The cells then pass through the first central station and optical fibers to a second central station and then to the receiving access multiplexer. During the transfer of the cells to the central stations, the headers may be changed. These changes in the address indicate the path that the cell is following between each pair of central stations to reach the receiving telephone.

In the prior art, to reassemble cells into signals at the access multiplex, the header and the payload in each cell have been transferred to a control memory that processes the header to determine what path it came from and thus reassemble the signal based upon this path. This has created certain difficulties. For example, it has required the control memory to be relatively large, particularly since the memory receives the header and the payload. It has also caused the transfer to be slow, particularly since the header and the payload have to be processed and the payload is generally twelve times longer than the header.

There are other problems in the operation of the ATM systems of the prior art. These problems have resulted from the fact that access lines and central stations receive cells from a number of different sources. Each source may illustratively constitute a different one of the calling stations and may illustratively have a different rate of transferring cells into successive time slots. For example, one source may transfer cells into an access line in every third (3d) time slot and another source may transfer cells into an access line in every fourth (4th) time slot. In the past, a decision has been made after the transfer of a cell in each time slot as to which source, if any, is to transfer a cell into the next time slot. This system has been cumbersome and slow because the transfer has to be interrupted after the transfer of a cell into each time slot while a decision is being made as to the transfer, if any, in the next time slot.

BRIEF DESCRIPTION OF THE INVENTION

This invention provides apparatus for, and methods of, overcoming the disadvantages discussed in the previous paragraphs as occurring in an ATM system. The apparatus and method of this invention minimize the time for processing the cells to update the headers as the cells are transferred through the telephone lines between the calling telephone and the receiving telephone. The apparatus and method of this invention also minimize the time for introducing the cells into successive time slots in the lines by scheduling in advance the cells to be provided in the successive time slots in the lines.

In one embodiment of the invention, a header and a payload in a cell are separated for transfer between a cell interface and a host memory. The header is transferred to a control memory. For transfer to the host memory, the control memory initially provides a host-memory region address and the region length. The payload is recorded in such address region. The control memory also provides a second host-memory region address, and length, when the payload length exceeds the payload length in the first address region. For transfer from the host memory to the cell interface, the control memory provides a host memory region address and the header combines the header and the payload and passes the combination to the cell interface.

Cells from different sources (i.e. terminals) are scheduled at table positions dependent upon their individual transfer rates. The cells at the scheduled positions are normally transferred in time slots corresponding to such positions. When more than one (1) cell is scheduled at the same position, one (1) cell is transferred on a preset priority basis to the corresponding time slot. The other cells are delayed for transfer subsequently in idle time slots (i.e. no cell normally scheduled) in the same or other priorities.

The cell delays for each source are accumulated to a maximum preset value. When the cell delays accumulated for a source exceed the normal time spacing between cells from that source, a cell from the source transfers a cell in an idle time slot prior to the normally scheduled time slot to compensate for such delay.

DETAILED DESCRIPTION OF THE INVENTION

Figure 1:
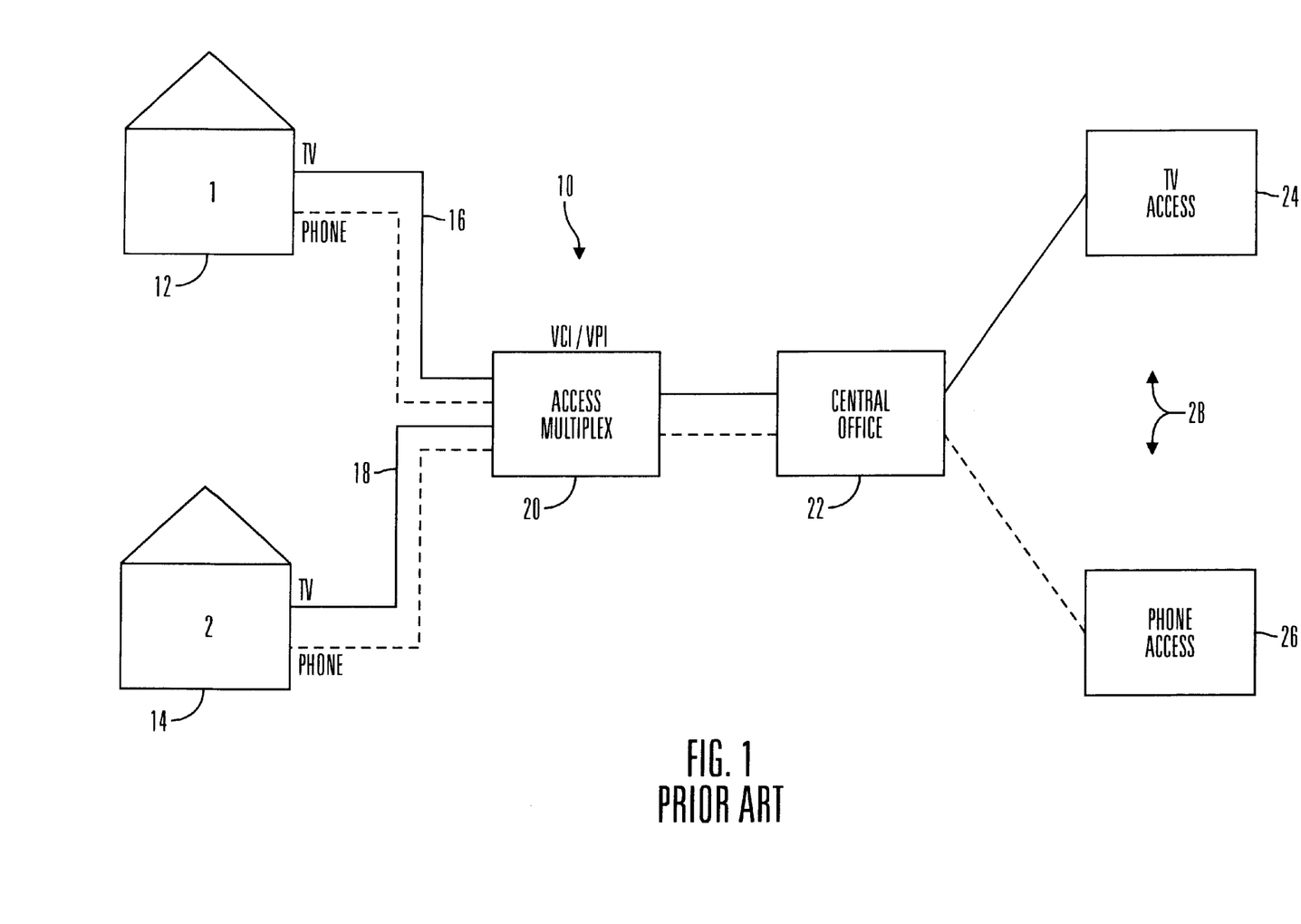
FIG. 1 is a schematic block diagram illustrating on a simplified basis the paths for transferring cells of information in an asynchronous transfer mode between a calling station and a receiving station through an access multiplex.

FIG. 1 illustrates in block form a system generally indicated at 10 and known in the prior art for transferring signals to and from a pair of telephones (or sources) 12 and 14 respectively through lines 16 and 18 to a common access multiplex 20. The telephone (or source) 12 may illustratively transmit or receive television signals and telephone (voice) signals on a line 16 and the telephone (or source) 14 may illustratively transmit or receive television signals and telephone (voice) signals on a line 18. All signals are digitally encoded. For purposes of simplification, the television signals are shown in FIG. 1 as being transferred in solid lines and the telephone signals are shown in FIG. 1 as being transferred in broken lines.

The signals in the lines 16 and 18 pass to the access multiplex 20. The respective digitally-encoded transmit signals are segmented into fixed-length cell payloads and a cell header is added to each cell payload to form a cell. Similarly, received cells are reassembled into the respective receive signals. The headers of the cells are generated in the access multiplex to provide a virtual channel indication and/or a virtual path indication. The header indicates the path which is being followed to pass the cells to a central office 22. The central office 22 may modify the header again in the cells to identify the path through which the cells are subsequently being transferred. The cells may then be transferred either to a television access 24 or to a telephone access 26 at receiving stations generally indicated at 28 in FIG. 1.

Figure 2:
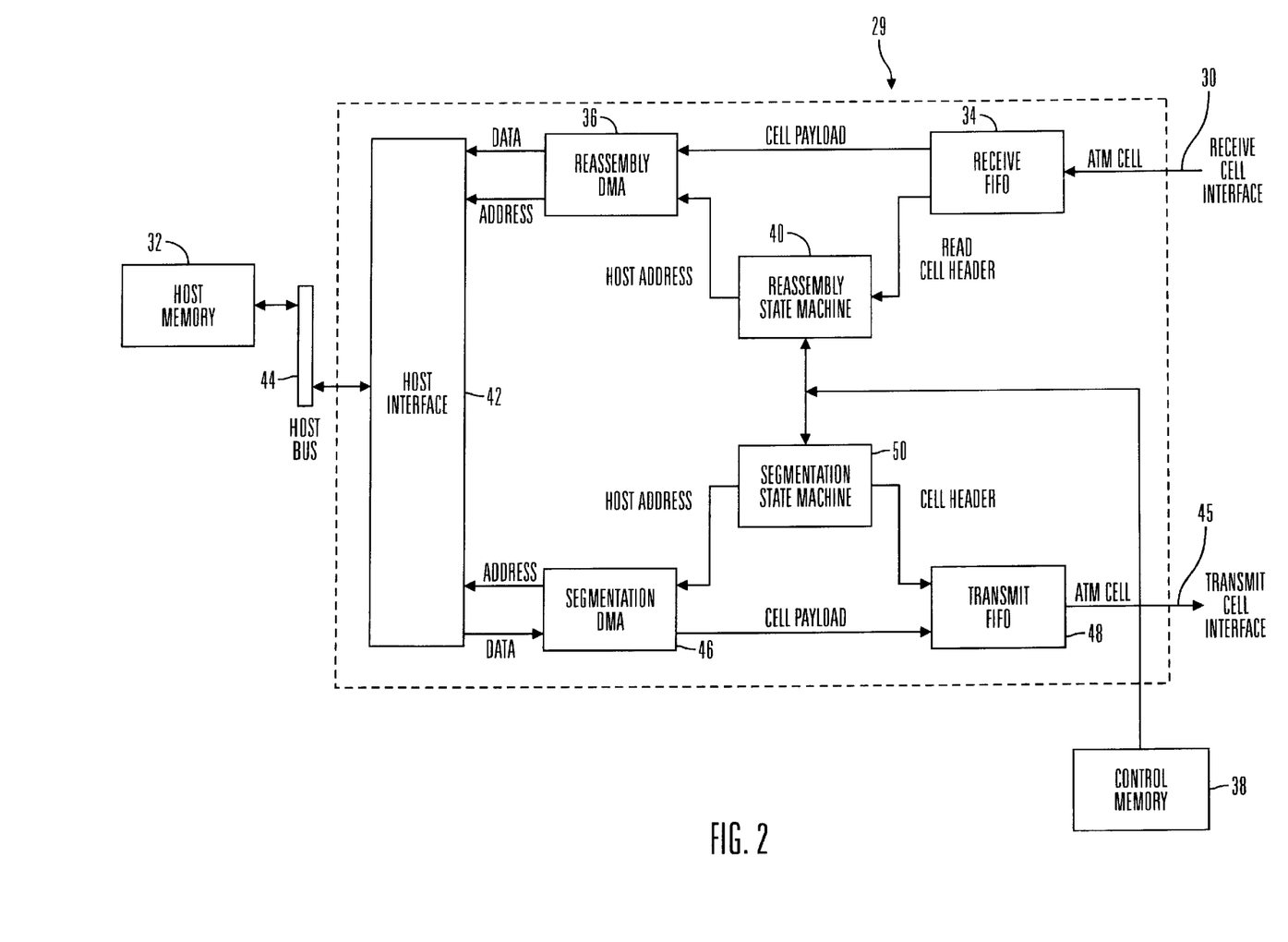
FIG. 2 is a schematic block diagram on a simplified basis of a system included in the system shown in FIG. 1 for transferring cell payloads between a cell interface and a host memory while processing the headers of the cells to control changes in the path of such transfer.

FIG. 2 illustrates one embodiment of a sub-system generally indicated at 29 and enclosed within a box defined by broken lines for use with the access multiplex 20 shown in FIG. 1 for providing a controlled transfer of ATM cell payloads between a line 30 from a receive cell interface and a host memory 32. When the cells are transferred from the line 30, the cells pass through a receive FIFO 34. The FIFO 34 constitutes a first-in-first-out memory well known in the art to provide a time buffer. The payload in each cell then passes to a reassembly direct memory access (DMA) stage 36. The header in each cell passes to a reassembly state machine 40 for processing.

The header in each cell is introduced from the reassembly state machine 40 to a control memory 38 which processes the header to provide addresses that indicate where the cell payloads are to be stored in the host memory 32. The addresses are then applied through the reassembly state machine 40 to the reassembly direct memory access (DMA) stage 36 to direct the payload from the FIFO 34 through a host interface 42 to a host bus 44. The cells are then transferred in the host memory 32 to the addresses indicated by the control memory 38.

Cells may also be transferred to a transmit cell interface through a line 45 by the sub-system 29 shown in FIG. 2. The segmentation state machine 50 reads addresses from the control memory 38 that indicate where cell payloads are stored in the host memory 32. The addresses are then applied by the segmentation state machine 50 to the segmentation direct memory access (DMA) 46 to direct the cell payloads to the transmit FIFO 48. The transmit FIFO 48 may be constructed in a manner similar to the receiver FIFO 34. The header is introduced by the control memory 38 to the segmentation state machine 50 for combination in the transmit FIFO 48 with the payload. The recombined cell then passes to the transmit cell interface line 45.

Figure 3:
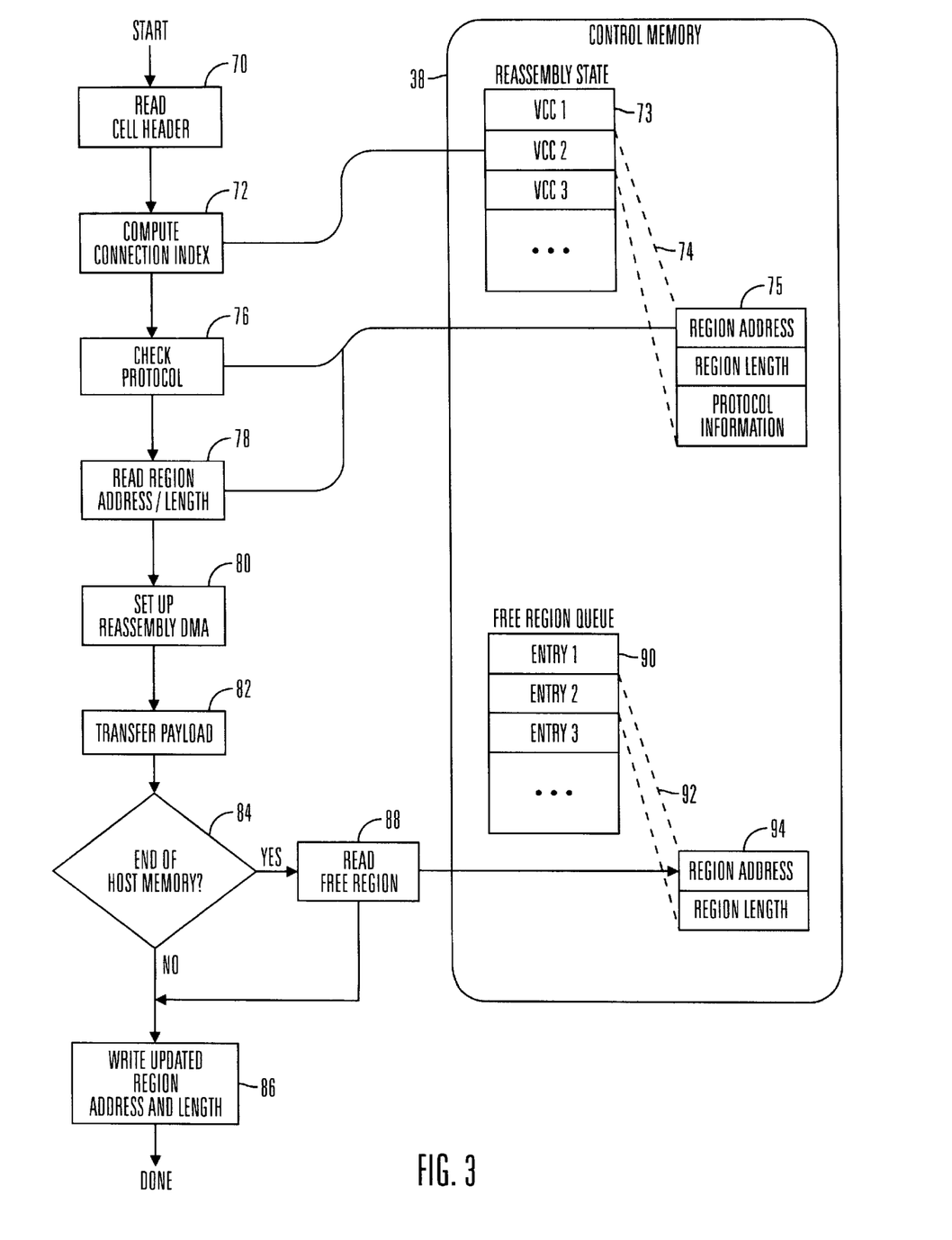
FIG. 3 is a schematic block diagram showing in additional detail the operation of the sub-system shown in FIG. 2 when the cell payloads are transferred from the receive cell interface to the host memory.

FIG. 3 illustrates in additional detail the operation of the sub-system shown in FIG. 2 in separating the header and the payload in a cell, reassembling the cell payloads and recording the reassembled payloads in the host memory 32. In the flow chart shown in FIG. 3, the cell header is initially read as at 70. The header is used to compute a "connection index" (see block 72) to yield a memory address in a reassembly state. This is indicated as a table 73 designated as "Reassembly State" in the control memory 38. The table 73 contains a plurality of virtual channel connections which are respectively designated as "VCC 1", "VCC 2", "VCC 3", etc.

Each of the virtual channel connections contains a table 75 which provides certain information including the address of a region of the host memory 38, the length of the region in the host memory and the protocol information for the virtual channel connection VCC. FIG. 3 schematically shows that the table containing the address region in the host memory 38, the length of the region and the protocol information for the virtual channel connection VCC are being selected from the virtual channel connection designated as "VCC 2". This is indicated by broken lines at 74 and by the table 75 in FIG. 3. It will be appreciated that this is schematic and illustrative and that other VCC's may be selected.

The cell from the line 30 in FIG. 2 relating to the receive cell interface is then checked with the protocol information in the VCC 2 virtual channel connection in the table 75 in the control memory 38 as indicated at 76 in FIG. 3. If the check indicates that the protocol information in the header and the payload is correct, the region address in the host memory 32 and the length of such region are read from the VCC 2 block in the control memory 38 as indicated at 78 in FIG. 3. The region address in the host memory 32 is passed to the reassembly DMA 36 in FIG. 2 as indicated at 80. The reassembly DMA 36 is then activated to transfer the cell payload from the receive FIFO 34 in FIG. 2 to the host memory 32 as indicated at 82 in FIG. 3.

As the successive cell payloads for the VCC 2 table 73 are reassembled in the region, a check is made in each reassembly to determine if the end of the region in the VCC 2 channel connection has been reached. This is indicated at 84 in FIG. 3. If the answer is "No", the region address for successive cells is incremented for the successive payloads in the VCC 2 channel connection recorded in the host memory region and the region length is decremented by the same amount. A block 86 in FIG. 3 indicates this.

If the end of the region in the VCC 2 table in the control memory 38 has been reached, a "Yes" indication is provided from the block 84. This causes a block 88 to be activated in FIG. 3. This block is designated as "Read Free Region". The control memory 38 contains a Free Region Queue indicated at 90 in FIG. 3. When the block 88 is activated, it causes the next entry in the Free Region Queue 90 to be selected. For example, when entry 1 in the free region queue has been previously selected, entry 2 in the Free Region Queue 90 is now selected. This is indicated by broken lines 92 extending from the entry 2 in the Free Region Queue 90 to a table 94 in FIG. 3.

Entry 2 in the Free Region Queue contains a new address region in the host memory 38 and the length of such region. This information is transferred to the table 75 in place of the information previously recorded in the table. The blocks 78, 80, 82, 84, 86 and 88 are now operated as discussed above to transfer the payloads in the cells on the line 30 to the regions in the host memory 32. At the end of this region, entry 3 in the Free Region Queue may be selected to provide a new address region in the host memory 32 and the length of such region if the payload has not been completely recorded in the host memory 32. The steps described above are repeated in this manner until all of the payload has been recorded in the host memory 32.

Figure 4:
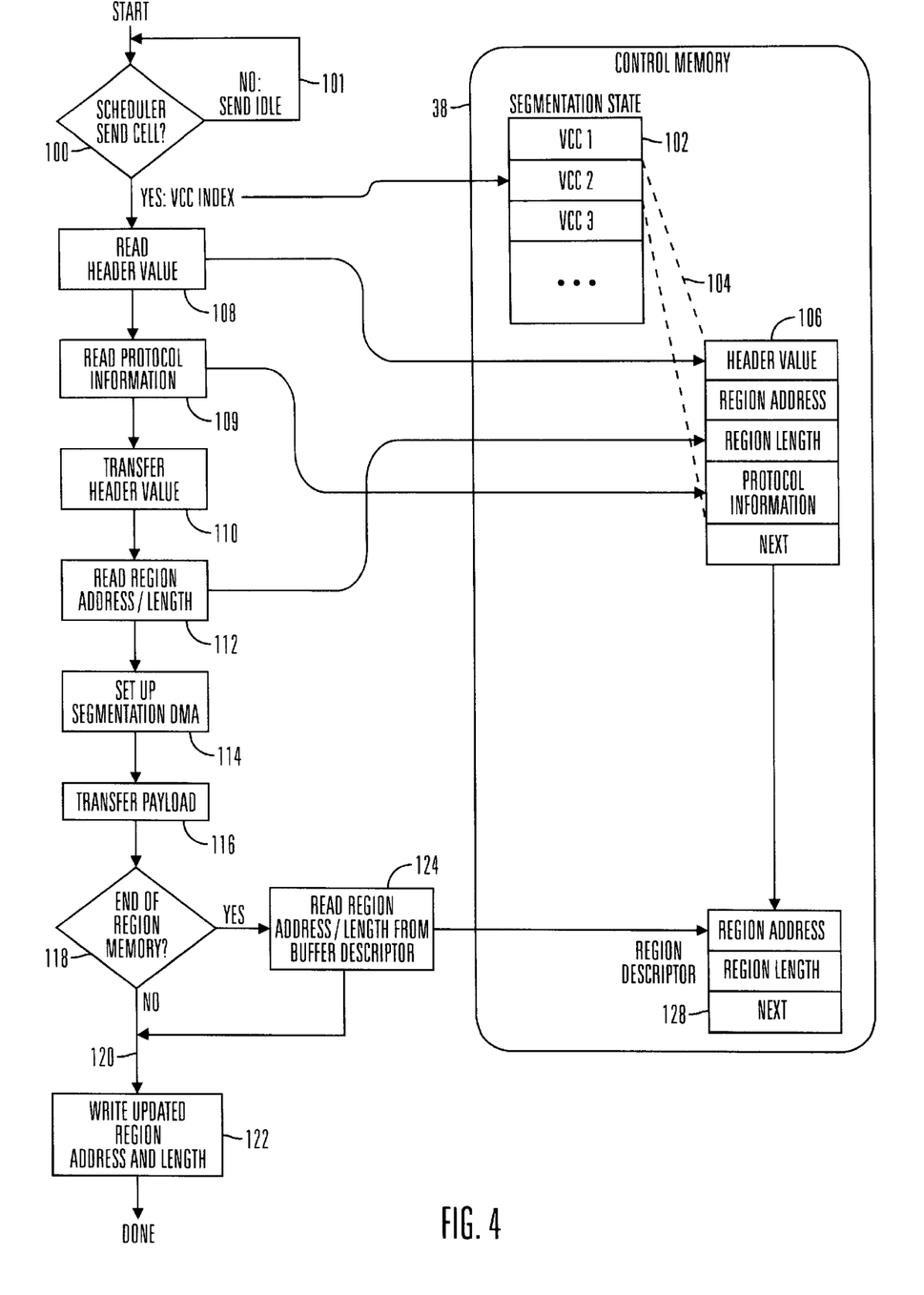
FIG. 4 is a schematic block diagram showing in additional detail the operation of the sub-system shown in FIG. 2 when the cell payloads are transferred from the host memory to the transmit cell interface.

FIG. 4 indicates in additional detail the operation of the sub-system shown in FIG. 2 in transferring the cell payloads from the host memory 32, reading the header from the control memory 38 to indicate the ATM path, combining the header and the payload into a cell and transferring the cell to the line 45. In the flow chart shown in FIG. 4, a block 100 is provided to determine if a VCC cell has been scheduled for a particular time slot. If a cell has not been scheduled, an idle cell (i.e. no cell recorded in a time slot) is transferred to the line 45 in FIG. 2. This is indicated by a line 101 in FIG. 4.

If a cell has been scheduled for the particular time slot, the block 100 in FIG. 4 selects a virtual channel connection in a table 102 in the control memory 38. This table is designated as "Segmentation State" in FIG. 4. As shown in FIG. 4, the table 102 contains a plurality of virtual channel connections which are illustratively designated as "VCC 1", "VCC 2", "VCC 3", etc. The virtual channel connection VCC 2 is illustratively shown as being selected in the table 102. This is indicated by broken lines 104. It will be appreciated that any other block could have been chosen. The virtual channel connection VCC 2 illustratively includes a header value (to indicate the path of transfer of the cell), a region address, a region length, protocol information and the position of the next region description in the host memory. This is illustrated at 106 in FIG. 2.

The header value and the protocol information in the VCC 2 block are read from the control memory 38 as indicated at 108 and 109 respectively in FIG. 4. The header value is then transferred to the transmit FIFO 48 in FIG. 2 as indicated at 110 in FIG. 4 and the region address and length are read from the VCC 2 virtual channel connection as indicated at 112 in FIG. 4. The segmentation DMA 46 in FIG. 2 is then set up (see block 114 in FIG. 4) and the payload is transferred from the host memory region to the transmit FIFO 48 in FIG. 2 (see block 116 in FIG. 4). A check is made in each transfer of the payload of successive cell to determine if the region being transferred for the virtual channel connection 106 is at the end of its length. This is indicated at 118 in FIG. 4.

If the end of the host region in the VCC 2 virtual channel connection has not been reached as indicated at 120 in FIG. 4, the region address at 106 in the control memory is incremented to account for the successive payload transferred to the transmit FIFO 48 and the region length is decremented by the same amount (see block 122). This provides an updated record of the region being processed in the virtual channel connection VCC 2 and an updated record of the remaining length of the region to be processed in the virtual channel connection VCC 2.

When the end of the region in the virtual channel connection VCC 2 has been reached, the address of the next region in the host memory 38 and the length of this region are read as indicated at 124. This next region is indicated as "Next" in the table 106 and is indicated in additional detail by a table 128 in FIG. 4. The table 128 is designated as a "Region Descriptor" to conform to the designation in the block 124. The table 128 also contains a block designated as "Next". The table 128 is then transferred to the position of the table 106 to replace the information previously in the table 106. The address information transferred from the table 128 to the table 106 is then processed in the blocks 108, 109, 110, 112, 114, 116, 118, 120, 122 and 124 in the same manner as described above. Upon the completion of the processing of the region in the table 106, the "Next" block in the table 106 is processed to determine the subsequent host address region in the host memory 32 and the length of this address region.

Figure 5:
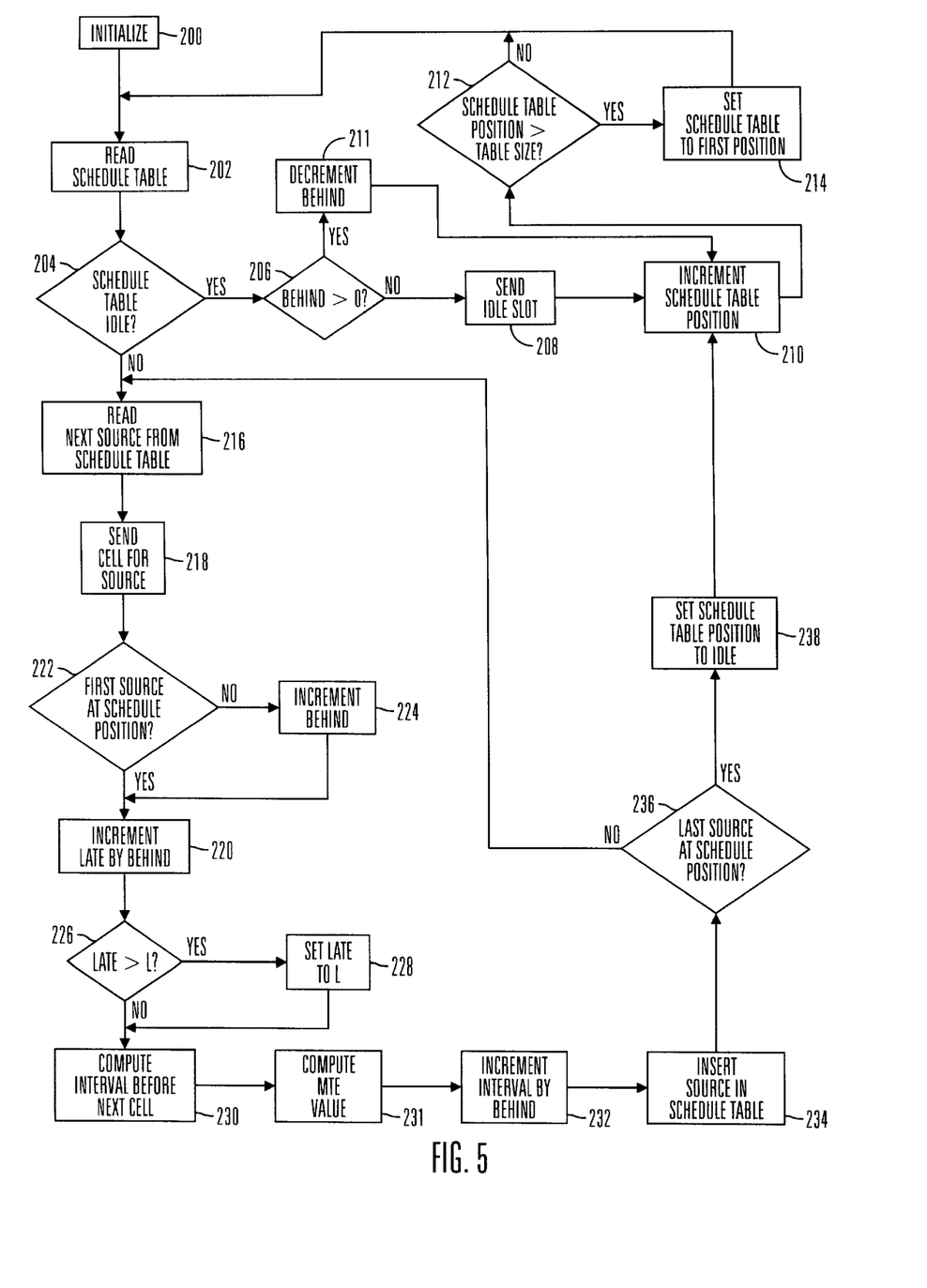
FIG. 5 is a schematic block diagram showing a sub-system for scheduling in advance a transfer of cell payloads from a plurality of sources to successive positions in a schedule table for subsequent transfer to successive time slots in an order corresponding to the scheduling of the cells in the successive positions in the schedule table.

FIG. 5 schematically illustrates a flow chart involving a system for, and method of, scheduling cells from different sources (e.g. telephones such as the telephones 12 and 14 in FIG. 1) for transfer in successive time slots in accordance with an individual rate for each of such different sources. As a first step in such flow chart, the parameters of the system and method are initialized. This is illustrated at 200 in FIG. 5.

Initialization includes the following steps:

1. The "late" state of each source (or telephone) is set to a value of zero (0) from a time standpoint. This means that none of the sources is initially late in transferring a cell from that source to one of a plurality of time slots.

2. A schedule formed from a plurality of successive positions is set to "Idle". This means that there is no source information in any of the positions in the schedule table.

3. The rate I of transferring cells from each source to the transmit cell interface 45 is scheduled at an individual value for each source. For example, a first source may be scheduled to transfer a cell in every third (3rd) position in the schedule table. This means that the rate I for the first source is three (3). Similarly, the rate I for a second source may be set to four (4) to indicate that a cell from that source is scheduled to be transferred to a position in the schedule table once in every four (4) positions.

5. The parameter L is individually set for each of the different sources. The parameter L for a source indicates the maximum value of the "late" state for that source. A source can be late by a value greater than L relative to the time that a cell from the source should be transferred in a time slot in accordance with the rate I for that source. However, the "late" value for the source is limited to L. For example, the maximum "late" value L for the first source may be twenty (20) time slots and the maximum late value L for the second source may be thirty (30) time slots.

6. The position in the schedule table is set to the first entry in that table.

7. The "behind" state is set to zero (0). The "behind" state indicates the number of cell slots that the schedule table is late relative to the intended time slots.

As previously described, the transfer of cells from a source according to its position in the schedule table is scheduled ahead of the time that such position is presented in the schedule table. After the schedule table has been initialized as described above, the current schedule table position is read as indicated at 202 in FIG. 5. It may sometimes happen that no cell is scheduled to be transferred at a particular position in the schedule table. This preferably occurs at times during the transfer sequence because the number of time slots during the transfer sequence should exceed the number of cells to be transferred from the different sources during such transfer sequence. In this way, all of the cells from the different sources will be almost certainly transferred in such transfer sequence.

When a position in the schedule table is idle as determined at 204 and as indicated as "Yes" to the right of the block 204, a determination is made (see block 206) whether the schedule table is late (or behind) relative to the intended time slots in the schedule table normally scheduled for such sources. If the schedule table is not late (or behind) in scheduling in a particular position in the schedule table and if no cell is normally scheduled at that position, a time slot corresponding to such position is filled with an idle cell. This is indicated at 208 in FIG. 5. Even though no cell payload is scheduled to be transferred in the particular position in the schedule table and an idle cell is actually transferred in the corresponding time slot, the schedule table is advanced or incremented to the next position as indicated at 210 in FIG. 5.

If the schedule table is late (or behind) relative to the intended time slots and there is an idle time slot as discussed above, the value of the "behind" state is decremented and no idle cell is transferred. This is indicated at 211 in FIG. 4. The schedule table is advanced to the next position as above as indicated at 210.

The schedule table has a limited number of positions. When an advance or incrementation has been made to the last position in the schedule table, the schedule table is returned to its initial position and a new advance is then made through the successive positions in the schedule table. A determination is made at 212 as to whether the last position in the schedule table has been reached. If the answer is no, the schedule table is read as indicated at 202 and as described above. If the answer is yes, the schedule table is returned to the first position (see block 214) and the schedule table is read as indicated at 202.

When the position being processed in the schedule table is not idle, the next source is read from the schedule table. This is the source scheduled to provide a cell at that position in the schedule table. The reading of the next source from the schedule table is indicated at 216 in FIG. 5. This cell is transferred to the time slot corresponding to such position as indicated at 218 in FIG. 5.

It may sometimes happen that cells from more than one (1) source may be scheduled for a particular position in the schedule table in accordance with the rates of transfer of cells from such different sources. Only the cell from one (1) source can be transferred into the time slot corresponding to such particular schedule position. The cells from the other sources scheduled at that particular table position are then delayed to subsequent time slots. This delay may occur for each of the different sources scheduled for the same schedule position in any different number of priorities which are well known in the art for other purposes than the purposes of this invention. For example, a simple priority may be on the basis of the relative times at which the sources have scheduled cells for the same position in the schedule table.

When a cell from a source is delayed in the manner discussed above to a subsequent time slot, the value of the behind state is incremented. This process is indicated at 222 and 224. If the schedule table is behind when a source has transferred a cell, the late value for the source is incremented in the number of time slots that the schedule table is behind as indicated at 220 in FIG. 5.

Every time that an increment occurs in the number of time slots that the transfer of a cell from a particular source is late or behind, a determination is made as to whether the count has exceeded the maximum value of L for that particular source. This is indicated at 226 in FIG. 5. If the maximum value L has been reached for that particular source, the late count for that particular source is maintained at L. (See 228 in FIG. 5). If the maximum count L has not been reached for that particular source, an advance is made from the block 226 to a block 230.

The block 230 determines the number of time slots before the next cell for the particular source block would normally be presented. This number is designated as "Interval" in FIG. 5. As shown in FIG. 5, Interval=I−Late  (1)

For example, if I=ten (10) for the particular source and if the transfer of a cell from that source into a time slot is late by seven (7) time slots, the Interval=10−7=three (3) time slots. This indicates that the next cell from the particular source should be scheduled for transfer three (3) time slots later.

Because the value of I is not necessarily an integral number of cell slots, the interval value computed at 230 may not be an integral number. The value used to schedule the source (the "schedule interval") into the schedule table will be the interval value computed at 230 and increased to the nearest integral number of cell slots. The "schedule value" will also be increased to a value of one (1) if less than zero as a source cannot be scheduled into the past. The new "late" value for the source is the "schedule interval" minus the desired interval computed in 230. These computations are indicated at 231.

If the schedule table is "behind" relative to the intended time slots, then future schedule table positions may not generate a transmit time slot as indicated by 211 and 210. The "schedule interval" is incremented by the number of time slots that the schedule table is behind to account for this possibility as indicated at 232.

The source is inserted into the schedule table at a time slot in accordance with the "schedule interval" in the discussion above. (See block 234 in FIG. 5). A determination is then made as to whether such insertion has occurred from the last source scheduled at the current position in the schedule table. This is indicated at block 236 in FIG. 5. If the answer is no, the next source scheduled at the schedule table is read as indicated at 216 in FIG. 5. This source is then processed through the blocks 218–234 (even numbers only) in the manner described above. If the answer is yes, the position at the schedule table is set to idle as indicated at 238 in FIG. 5 and the position at the schedule table is incremented as indicated at 210 in FIG. 5.

This invention provides certain advantages over the prior art. It separates the header and the payload in each cell, processes the header and reassembles the payload directly to the host memory 32 in FIG. 2. This provides a faster response time than in the prior art since only the header in each cell has to be processed and no time is lost in processing the payload in such cell as in the prior art. This saving in time can be significant since the payload in each cell is considerably longer than the header in such cell.

The invention is also advantageous in providing a control memory for processing the header. Since only the header is processed in the control memory 38, the control memory can be considerably smaller, and can be significantly less costly, than in the prior art since, in the prior art, the control memory has had to have sufficient capacity and speed to process the header and the payload.

When the cells are being transferred through the line 30 from the receive cell interface to the host memory 32, the control memory 38 processes the header to identify information relating to the region in the host memory 32 where the payload is to be stored. When the cells are being transferred from the host memory 32 to the transmit cell interface, the headers are read from the control memory 38 to provide an ATM address. This header can then be combined with the payload and the cell containing the combined header and payload can be transferred to the line 45.

The invention also has other advantages. It schedules cells at successive positions in a schedule table in advance of the time when such cells are to be transferred to time slots from such successive positions in the schedule table. By scheduling such cells in advance of the transfer of the cells to the time slots, no time is lost as in the prior art in determining where and when to transfer each cell after the transfer of the previous cell in the sequence.

The scheduling discussed in the previous paragraph also has other advantages. When cells from more than one (1) source are scheduled at a particular position in the schedule table, the invention provides for the transfer of one (1) of the cells to the time slot corresponding to the scheduled position. The invention then provides for the sequential transfer, to subsequent time slots which would otherwise be idle, of the other cells scheduled at the particular table position.

The invention also determines at each instant the number of time slots in which the transfer of cells from each source is late. The invention additionally provides for the transfer of cells, from sources in which the cells are late, into otherwise idle time slots to reduce thereafter the number of time slots in which the cells from such source are late. In this way, the invention is able to provide an efficient operation in transferring cells from a number of different sources into successive time slots at different rates.

In providing additional transfers of cells that are late, the invention also limits the number of cells that can be transferred as "late". This will prevent the sources from violating certain important traffic parameters in ATM networks.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In a method of transferring cells from a plurality of sources each operative to provide cells at an individual rate for such transfer, the steps of:

scheduling a transfer of cells to be made from each of the sources in the plurality at an individual rate for each of such sources, providing a schedule table with successive positions, scheduling each of the sources in the plurality to provide cells at the different positions in the schedule table in accordance with the schedule of the rate at which the cells are to be transferred from such source, determining the number of positions in the schedule table that each source is late in transferring cells at the different positions in the schedule table as a result of a conflict in the scheduling of the cells from more than one source in the plurality at individual ones of the different positions in the schedule table, and scheduling the sources to provide cells in idle positions in the schedule table when such sources are late in transferring cells at the different positions in the schedule table.

2. In a method as set forth in claim 1 wherein the cells from sources scheduled for transfer at the same position in the schedule table are transferred at different positions, other than such same position, in the schedule table.

3. In a method as set forth in claim 2 wherein the sources in the plurality transfer cells at positions in the schedule table after the particular position in the schedule table, when such sources are scheduled for transferring cells at the particular position in the schedule table, in accordance with the relative times at which such sources schedule such cells for transfer at such particular position in the schedule table.

4. In a method as set forth in claim 1 wherein cells from a plurality of sources are scheduled for transfer at a particular position in the schedule table the cell from one of such plurality of sources is transferred at such particular position in the schedule table and wherein cells from the other sources in such plurality are transferred at positions which are after the particular position in the schedule table and which are otherwise idle.

5. In a method as set forth in claim 4 wherein sources scheduled for transferring cells from the particular position in the schedule table transfer cells at otherwise idle positions in the schedule table after the particular position in an order related to the relative times at which such sources have scheduled cells for transfer at such particular position in the schedule table.

6. In a method as set forth in claim 1 wherein an increment in a late count is provided for each position in the schedule table that a transfer of a cell from one of the sources is delayed from transfer beyond its position scheduled for transfer in the schedule table and wherein the increments in the late count are not provided for each position in the schedule table that the cell from such one of the sources is delayed from transfer beyond its scheduled position in the schedule table when such late count for the transfer of such one of the sources reaches a particular value.

7. In a method as set forth in claim 6 wherein the late count for such one of the sources is decremented by the difference between the particular number of schedule positions in the schedule table and the number of positions in the schedule table between the two particular positions.

8. In a method as set forth in claim 1 wherein successive cells from one of the sources are scheduled to be transferred at two positions separated in the schedule table by a particular number of schedule positions and wherein successive cells from such one of the sources are transferred at two particular positions separated in the schedule table by a number of positions less than the particular number when the transfer of such cells from such source are delayed from their scheduled positions of transfer in the schedule table by a number of schedule positions greater than the particular number and when no cells from any of the sources in the plurality are scheduled to be transferred at the second one of such two particular positions.

9. In a method of transferring cells from a plurality of sources each operative to provide cells at an individual rate for such transfer, the steps of:

providing a schedule table having a plurality of positions for the transfer of cells from the sources in the plurality at such positions, scheduling cells from each of the sources to be transferred at the different positions in the schedule table at an individual rate for each of such sources, providing the cells from each of the sources in the plurality for transfer at the different positions in the schedule table in accordance with the rate at which the cells from each of such sources are scheduled to be transferred from such source, transferring the cells at the successive positions in the schedule table in accordance with the scheduling of such cells for transfer at the successive positions in the schedule table, and providing a delayed transfer, in positions not otherwise scheduled to receive cells in the schedule table, of cells from individual ones of the sources in the plurality when such cells are scheduled for transfer at the same position in the schedule table with cells from other ones of the sources in the plurality.

10. In a method as set forth in claim 9 wherein a schedule is made, at positions in the schedule table ahead of the time for the transfer of the cells at such positions, to determine the relative times for the transfer of such cells at such positions in the schedule table.

11. In a method as set forth in claim 9 wherein idle positions are provided in the schedule table where no cells would otherwise be transferred and wherein cells scheduled for transfer at positions in the schedule table, but not actually transferred at such scheduled positions in the schedule table, are transferred at idle positions in the schedule table after such scheduled positions in the schedule table.

12. In a method as set forth in claim 9 wherein the number of positions in the schedule table after the position normally scheduled in the schedule table for the transfer of a cell from such source is determined for such cell and wherein the cell from such source is transferred when the number of positions in the schedule table from such normally scheduled position for such cell is at least as great as the number of positions normally scheduled in the schedule table between successive ones of the cells from such source.

13. In a method as set forth in claim 9 wherein an increment is provided, at each individual one of the positions in the schedule table, in the number of positions in the schedule table that a transfer of a cell from an individual one of the sources is behind a particular position in the schedule table for a scheduled transfer of such cell from such individual one of the sources and wherein such increment is provided for such delay in the transfer of such cell from such individual one of the sources only until the cumulative number of such increments has reached a particular count of such increments for such cell from such individual one of the sources.

14. In a method as set forth in claim 13 wherein successive cells from such individual one of the sources are scheduled for transfer at intervals of a particular number of positions in the schedule table and wherein the number of positions in the schedule table between the transfer of successive cells from such individual one of the sources is decreased by the cumulative number of such increments when a transfer of a cell from such individual one of the sources is provided at a particular position in the schedule table and when the cumulative number of such increments is less than the particular number at such particular position in the schedule table.

15. In a method of transferring cells from a plurality of sources each operative to provide cells at an individual rate for such transfer, the steps of:

providing a plurality of positions in a schedule table, scheduling cells at successive ones of the positions in the schedule table from each individual one of the sources in the plurality in accordance with the rate scheduled for the cells from such source, transferring, at each of the successive positions in the schedule table, the cell scheduled for transfer at such position when there is only one cell scheduled to be transferred at such successive position, and providing a delay from a first position in the schedule table for the transfer of cells from individual ones of the sources in the plurality when a transfer is to be made of such cells from such individual ones of the sources at such first position in the schedule table and such transfer of such cells is not made at such first position.

16. In a method as set forth in claim 15 wherein the delayed cells from the individual ones of the sources in the plurality are scheduled for transfer at a second position in the schedule table after such first position when no cell from any of the sources in the plurality is otherwise scheduled for transfer at such second position in the schedule table.

17. In a method as set forth in claim 16 wherein a late count is provided of the cumulative number of positions in the schedule table that a cell from an individual one of the sources is delayed beyond the position scheduled in the schedule table for the transfer of such cell and wherein the late count is incremented for each position in the schedule table that such cell from such individual one of the sources is delayed beyond the position scheduled in the schedule table for the transfer of such cell.

18. In a method as set forth in claim 17 wherein the late count for such cell from such individual one of the sources is incremented, only until a particular maximum value, for each position in the schedule table that such cell is delayed beyond the position scheduled in the schedule table for the transfer of such cell.

19. In a method as set forth in claim 18 wherein successive cells from such individual one of the sources are normally transferred at positions separated in the schedule table by a particular value and wherein the late count for the cells from such individual one of the sources is decremented when two successive cells from such individual one of the sources are transferred at positions separated in the schedule table by a number less than the particular value.

20. In a method as set forth in claim 19 wherein the decrement in the late count constitutes the difference between the particular value and the number of positions separating the transfer of the two successive cells in the schedule table.

21. In a method as set forth in claim 15 wherein
a cell from one of the individual one of the sources is scheduled for transfer in a second position in the schedule table after the first position in the schedule table when such second position in the schedule table is not scheduled for the transfer of a cell from any of the sources in the plurality.

22. In a method as set forth in claim 15 wherein
the schedule table is provided with a limited number of successive positions and wherein
a determination is made in each scheduling of a cell at one of the positions in the schedule table whether the scheduling is at the last position in the schedule table and wherein
the schedule table is advanced to the next position in the schedule table when the scheduling is not at the last position in the schedule table and wherein
the schedule table is set to the first position in the schedule table when the scheduling is at the last position in the schedule table.

23. In a method as set forth in claim 15 wherein
each source has a value indicating the number of positions in the schedule table that such source is late in transferring a cell at one of the positions in the schedule table and wherein
the late value for the transfer of a cell from such source is incremented in the number of positions in the schedule table that the schedule table is behind in the transfer of a cell from such source at a position in the schedule table if the schedule table is late in the scheduled transfer of a cell from such source and a cell from the source is not transferred at the position in the schedule table.

24. In a method of transferring cells from a plurality of sources each operative to provide cells at an individual rate for such transfer, the steps of:
providing a plurality of positions in a schedule table,
scheduling the cells from individual ones of the sources for transfer at successive ones of the positions in the schedule table in accordance with the rate scheduled for the transfer of the cells in such sources,
transferring, at each of the successive positions in the schedule table, the cell scheduled for transfer at such successive position in the schedule table when such cell is the only cell scheduled for transfer at such successive position,
transferring the cell from a particular one of the sources in the plurality at a first particular position in the table when this cell and cells from other individual sources in the plurality are scheduled for transfer at such first particular position in the table,
providing for the transfer of cells from each of the other individual sources in the plurality, a delay from the first particular position in the schedule table to positions in the schedule table after the first particular position,
accumulating the number of the delays in the positions in the schedule table for the transfer of cells from each of the other individual sources in the plurality, and
providing a delayed transfer of the cells from each individual one of the other sources at positions, after the first particular position, in the schedule table not otherwise scheduling a transfer of a cell from any of the sources in the plurality when there is an accumulated delay for such individual one of the other individual sources of a number of positions in the schedule table greater than the number represented by the normal rate of transferring successive cells from such individual one of the other individual sources.

25. In a method as set forth in claim 24 wherein
a number corresponding to the number of positions in the schedule table normally scheduled between the transfer of successive cells in each source is subtracted from the accumulated delay for such source when a cell from such source is transferred on the delayed basis at a position in the schedule table.

26. In a method as set forth in claim 24 wherein
the schedule table is provided with a limited number of successive positions and wherein
a determination is made in each scheduling of a cell at one of the positions in the schedule table whether the scheduling is at the last position in the schedule table and wherein
the schedule table is advanced to the next position in the schedule table when the scheduling is not at the last position in the schedule table and wherein
the schedule table is set to the first position in the schedule table when the scheduling is at the last position in the schedule table.

27. In a method as set forth in claim 26 wherein
the schedule table is advanced from one position in the schedule table to the next position in the schedule table when there is no cell scheduled for transfer at the one position in the schedule table.

28. In a method as set forth in claim 24 wherein
there are a limited number of successive positions in the schedule table and wherein the limited number of successive positions in the schedule table is defined by a first position and a last position and wherein
there is sequential advance in the scheduling of the successive positions in the schedule table and wherein
the scheduling is advanced from the last position in the table to the first position in the schedule table every time that the scheduling has advanced to the last position in the schedule table.

29. In a method of transferring cells, the steps of:
providing a plurality of sources each scheduled to provide cells at an individual rate for transfer,
providing a schedule table having a plurality of positions,
scheduling the cells from the different sources in the plurality at the different positions in the schedule table in accordance with the individual rate at which time the cells in each source are provided for transfer,
transferring the cells from the different sources, at the positions scheduled in the schedule table for the transfer of such cells at successive positions in the schedule table in the order scheduled for the transmission of such cells at the successive positions in the schedule table,
the table having a limited number of positions for the scheduling of the transfer of cells from the sources in the plurality, the limited number of positions being defined by a first position and a last position,
advancing the table from the last position in the schedule table to the first position in the schedule table when the transfer of cells has been provided at the last position in the schedule table,
advancing through a first position in the schedule table without transferring a cell from any of the sources in the plurality at such position in the schedule table when no cell has been scheduled for transfer at such first position in the schedule table, and delaying, to a position in the schedule table after a second position in the schedule table, a cell scheduled for transfer at the second position in the schedule table from an individual one of the sources in the plurality when that cell and the cell from another one of the sources in the plurality have been scheduled for transfer at the second position in the schedule table and when the cell from such other one of the sources in the plurality has been transferred at the second position in the schedule table.

30. In a method of transferring cells, the steps of:

providing a plurality of sources each scheduled to provide cells at an individual rate for transfer, providing a schedule table having a plurality of positions, scheduling the cells from the different sources in the plurality at the different positions in the schedule table in accordance with the individual rate at which time the cells in each source are provided for transfer, transferring the cells from the different sources, at the positions scheduled in the schedule table for the transfer of such cells at successive positions in the schedule table, in the order scheduled for the transfer of such cells at the successive positions in the schedule table the table having a limited number of positions for the scheduling of the transfer of cells from the sources in the plurality, the limited number of positions being defined by a first position and a last position, advancing the table from the last position in the schedule table to the first position in the schedule table when the transfer of cells has been provided at the last position in the schedule table, advancing through a first position in the schedule table without transferring a cell from any of the sources in the plurality at such position in the schedule table when no cell has been scheduled for transfer at such first position in the schedule table, and delaying, to a position in the schedule table after a second position in the schedule table, a cell scheduled for transfer at the second position in the schedule table from an individual one of the sources in the plurality when that cell and the cell from another one of the sources in the plurality have been scheduled for transfer at the second position in the schedule table and when the cell from such other one of the sources in the plurality has been transferred at the second position in the schedule table, wherein each source has a value indicating the number of positions in the schedule table that such source is late in transferring a cell at one of the positions in the schedule table and wherein the late value for the cells in such source is incremented, in the number of positions in the schedule table that the schedule table is behind in the transfer of cells from such source, for each position in the schedule table that a cell from such source is not transferred at such position in the schedule table.

31. In a method of transferring cells, the steps of:

providing a plurality of sources each scheduled to provide cells at an individual rate for transfer, providing a schedule table having a plurality of successive positions, scheduling the cells from each of the different sources in the plurality for transfer at the different positions in the schedule table in accordance with the individual rate at which the cells in each source are provided for transfer, transferring the cells from the sources at successive positions in the schedule table in accordance with the schedule for the transfer of such cells at the successive positions in the table, and advancing at a particular position in the schedule table without transferring a cell from any of the sources in the plurality at such position when no cell from any of the sources has been scheduled for transfer at the particular position in the schedule table, wherein the particular position in the schedule table constitutes a first particular position and wherein cells from different sources in the plurality are scheduled for transfer at a second particular position in the schedule table in accordance with the individual rates for the transfer of cells from such different sources and wherein the cell from one of such different sources is transferred at the second particular position in the schedule table and wherein the cells from the other ones of such different sources are transferred at third particular positions delayed from the second particular position when no cell from any of the sources is otherwise scheduled for transfer at the third particular positions in the schedule table.

* * * * *